United States Patent
Hansen et al.

(10) Patent No.: US 9,840,176 B1
(45) Date of Patent: Dec. 12, 2017

(54) SEAT WITH INTEGRATED FOLDABLE TABLE

(71) Applicant: Toyota Motor Engineering & Manufacturing North America, Inc., Erlanger, KY (US)

(72) Inventors: Charles S. Hansen, Northville, MI (US); Ryan S. Tan, Aurora, CO (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/223,425

(22) Filed: Jul. 29, 2016

(51) Int. Cl.
  *B60N 2/30* (2006.01)
  *B60N 3/00* (2006.01)

(52) U.S. Cl.
  CPC ............ *B60N 3/001* (2013.01); *B60N 2/305* (2013.01); *B60N 2/3047* (2013.01)

(58) Field of Classification Search
  CPC ....... B60N 3/001; B60N 2/3047; B60N 2/304
  USPC .......................................................... 296/69
  See application file for complete search history.

(56) References Cited

U.S. PATENT DOCUMENTS

| | | | | | |
|---|---|---|---|---|---|
| 2,460,712 | A | * | 2/1949 | Peterson | B60N 3/001 108/131 |
| 2,493,170 | A | * | 1/1950 | Stiff | B60N 3/001 108/19 |
| 3,880,091 | A | * | 4/1975 | Heinonen | A47B 31/06 108/44 |
| 4,191,417 | A | * | 3/1980 | Ferrara | B60N 2/3013 296/65.05 |
| 5,992,331 | A | * | 11/1999 | Inoue | A47B 3/0912 108/132 |
| 6,161,896 | A | * | 12/2000 | Johnson | B60R 7/043 297/188.08 |
| 6,488,327 | B1 | * | 12/2002 | Pearse | B60N 2/2863 296/37.15 |
| 6,540,279 | B1 | * | 4/2003 | Bargiel | B60R 7/043 296/37.15 |
| 6,705,658 | B2 | | 3/2004 | Jach et al. | |
| 6,860,550 | B2 | | 3/2005 | Wojcik | |
| 7,077,451 | B2 | | 7/2006 | Rhodes et al. | |
| 7,398,737 | B1 | * | 7/2008 | Martellaro | B60N 3/001 108/143 |
| 8,303,036 | B2 | | 11/2012 | Hankinson et al. | |
| 2007/0040406 | A1 | * | 2/2007 | Jovicevic | B60N 2/2809 296/65.01 |
| 2007/0052264 | A1 | | 3/2007 | Lee | |

(Continued)

FOREIGN PATENT DOCUMENTS

EP          0980790 A2 *  5/2017

*Primary Examiner* — Jason S Morrow
(74) *Attorney, Agent, or Firm* — Christopher G. Darrow; Darrow Mustafa PC (57) ABSTRACT

Vehicle seat assemblies may be foldable in a plurality of configurations. The seats may be foldable so as to provide a space between a seat bottom and a seat back. Seats may be foldable so as to provide a space in front of the seat bottom and the seat back. A moveable table may be a component of the seat assembly in the vehicle, with the table operable to provide a relatively flat surface when in an operative position. The table may utilize the space provided between the seat bottom and the seat back and/or the space provided in front of the seat bottom and the seat back when in the operative position. Additionally, the table may be stowed under the seat when not in use.

20 Claims, 6 Drawing Sheets

(56) References Cited

U.S. PATENT DOCUMENTS

| | | |
|---|---|---|
| 2008/0303321 A1 | 12/2008 | Powell |
| 2014/0183910 A1 | 7/2014 | Ulbrich-Gasparevic et al. |
| 2015/0130231 A1 | 5/2015 | Lindsay et al. |
| 2015/0158400 A1* | 6/2015 | Yin .......................... B60N 2/34 297/67 |
| 2017/0015228 A1* | 1/2017 | Berno .................... B60N 3/002 |

* cited by examiner

SEAT WITH INTEGRATED FOLDABLE TABLE

FIELD

The subject matter described herein relates in general to vehicle seat assemblies and, more particularly, to vehicle seat assemblies that have a foldable table.

BACKGROUND OF THE INVENTION

Modern vehicles commonly have seats to secure an occupant while the vehicle is in motion. More specifically, vehicle seats may provide a surface which occupants may sit on in the moving vehicle. For example, vehicle seats commonly include a seat back and a seat bottom, with both the seat back and the seat bottom angled as to comfortably contain the occupant in the moving vehicle. While the vehicle seat is well suited for use when the vehicle is in motion, it would be advantageous to provide a seat that satisfies additional requirements when the vehicle is not in motion. For example, the occupant may desire a flat surface, such as a table, when the vehicle is at rest. Given the space constraints in the vehicle, it would be desirable that the flat surface be stowed so as to not encumber the occupant or useable space when not needed.

SUMMARY

Vehicle seat assemblies may be foldable in a plurality of configurations. The seats may be foldable so as to provide a space between a seat bottom and a seat back. Seats may be foldable so as to provide a space in front of the seat bottom and the seat back. A moveable table may be a component of the seat assembly in the vehicle, with the table operable to provide a relatively flat surface when in an operative position. The table may utilize the space provided between the seat bottom and the seat back and/or the space provided in front of the seat bottom and the seat back when in the operative position. Additionally, the table may be stowed under the seat when not in use.

In one respect, the present disclosure is directed to a seat assembly for a vehicle. The seat assembly includes a seat back, a seat bottom and a table. The seat back has opposite upper and lower ends. The seat bottom has opposite inner and outer ends and opposite upper and lower surfaces. The seat bottom moves relative to the seat back between a generally horizontal first position and a second position. The inner end of the seat bottom is adjacent the lower end of the seat back when the seat bottom is in the first position. The seat bottom is operable to support the occupant on the upper surface when in the first position. The table is operatively coupled to the vehicle. The table has a body member movable between a stowed position and an operable position when the seat bottom is in the second position. The body member, when in the stowed position, is disposed adjacent the lower surface of the seat bottom when in the first position. The body member is generally horizontally orientated when in the operative position.

In another respect, the present disclosure is directed to a seat assembly for a vehicle. The seat assembly includes a seat back, a seat bottom and a table. The seat back has opposite upper and lower ends. The seat bottom has opposite inner and outer ends and opposite upper and lower surfaces. The seat bottom moves relative to the seat back between a generally horizontal first position and a second position. The inner end of the seat bottom is adjacent the lower end of the seat back when the seat bottom is in the first position. The seat bottom is operable to support an occupant on the upper surface when the seat bottom is in the first position. The table is operatively coupled to the vehicle. The table has a body member and at least one first leg. The body member of the table is moveable between a stowed position and an operative position when the seat bottom is in the second position. The body member, when in the stowed position, is disposed adjacent the lower surface of the seat bottom when in the first position. The body member is generally horizontally orientated when in the operative position. The body member has opposite inner and outer edges. The inner edge is closer to the seat back than the outer edge when the body member is in the operative position. The at least one first leg is pivotally coupled to the body member adjacent one of the inner and outer edges. The at least one first leg extends generally downwardly from and supports the body member when in the operative position. The at least one first leg is tucked below the body member when in the stowed position.

In yet another respect, the present disclosure is directed to a seat assembly for a vehicle. The seat assembly includes a seat back, a seat bottom and a table. The seat back has opposite upper and lower ends. The seat bottom has opposite inner and outer ends and opposite upper and lower surfaces. The seat bottom moves relative to the seat back between a generally horizontal first position and a second position. The seat bottom moves forming a space either between the seat bottom and the seat back or in front of the seat back and seat bottom. The inner end of the seat bottom is adjacent the lower end of the seat back when the seat bottom is in the first position. The seat bottom is operable to support an occupant on the upper surface when in the first position. A table is operatively coupled to the vehicle. The table has a body member movable between a stowed position and an operative position when the seat bottom is in the second position. The body member, when in the stowed position, is disposed adjacent the lower surface of the seat bottom when in the first position. The body member is generally horizontally orientated when in the operative position.

DETAILED DESCRIPTION

Detailed embodiments are disclosed herein, however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the FIGS., but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
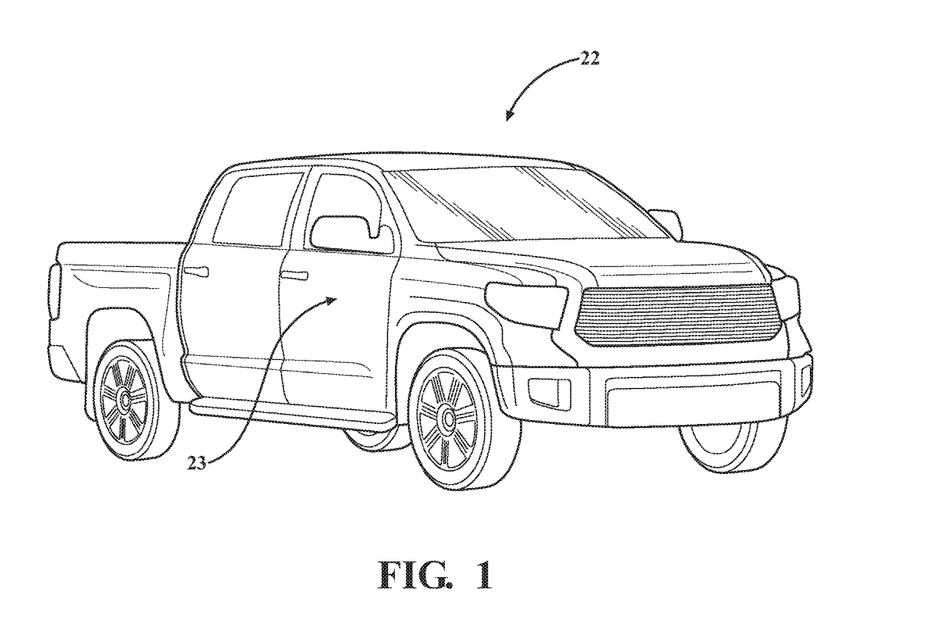
FIG. 1 is a perspective view of an exemplary vehicle in which a seat assembly according to the present disclosure may be utilized.

Referring to FIG. 1, an example of a vehicle 22 is shown. As used herein, "vehicle" means any form of motorized transport. In one or more implementations, vehicle 22 can be an automobile. While arrangements will be described herein with respect to automobiles, it will be understood that embodiments are not limited to automobiles. In some implementations, vehicle 22 may be a watercraft, an aircraft, a train, a space craft or any other form of motorized transport.

Vehicle 22 can define an interior that can be configured to transport one or more occupants. For example, vehicle 22 can generally include a door 23 that may be opened to allow access to the interior compartment therein. In one or more arrangements, vehicle 22 can include one or more seat assemblies 20 operatively connected to the floor of vehicle 22. The term "operatively connected" as used throughout this description, can include direct or indirect connections, including connections without direct physical contact. For example, seat assembly 20 may be operatively connected directly to the floor or to one or more rails operatively connected to the floor. Seat assembly 20 can be configured for movement within the interior. For example, seat assembly 20 can be configured for fore and aft movement along the rails.

Referring to FIGS. 2A-2E, seat assembly 20 may include features to provide comfort and support for occupant. In one or more arrangements, seat assembly 20 may include a seat back 24 and a seat bottom 26. Seat bottom 26 may have a seating surface 30 for supporting a seated occupant on seat assembly 20. A bottom surface 32 of seat bottom 26 may be opposite seating surface 30. Seat bottom 26 may be moveable relative to seat back 24 between a generally horizontal first position 34, such as that shown in FIG. 2A, and second position 36, such as that shown in FIGS. 2B-2E. Second position 36 may be a generally vertical position for seat bottom 26 wherein seat bottom 26 is relatively perpendicular to a horizontal axis of vehicle 22. An occupant may sit on seat assembly 20 when seat bottom 26 is in first position 34. Seat back 24 may have a cushioned surface for supporting a back side of a seated occupant. Seat back 24 has opposite upper and lower ends 40, 42. Seat back 24 may be operatively coupled to vehicle 22 via a rear seat post 44. Rear seat post 44 may have a recliner mechanism operable to recline seat back 24 in a forward or a rearward direction.

In one or more arrangements, seat assembly 20 may include a table 48 operatively coupled to vehicle 22. Table 48 may have stowed position 50, such as that shown in FIGS. 2A-2B, wherein table 48 does not encumber a seated occupant in vehicle 22. Table 48 may move to an operative position 52, such as that shown in FIGS. 2D-2E, wherein table 48 may provide a generally horizontal working surface 49. When moving from stowed position 50 to operative position 52, table 48 may occupy a space 51 between seat bottom 26 and seat back 24. FIG. 2C shows an intermediate position 53 for table 48 wherein table 48 is between stowed position 50 and operative position 52. Table 48 may include a body member 54 and a plurality of legs. Body member 54 may have opposite upper and lower surfaces 56, 58. Upper surface 56 may be a generally horizontal working surface 49 when table 48 is in operative position 52. Upper surface 56 may further include a removable top to allow for cleaning, replacement or the like. The plurality of legs may include one or more first legs 60 and one or more second legs 62. Both first leg 60 and second leg 62 may be operatively coupled to lower surface 58 of body member 54.

Figure 2A:
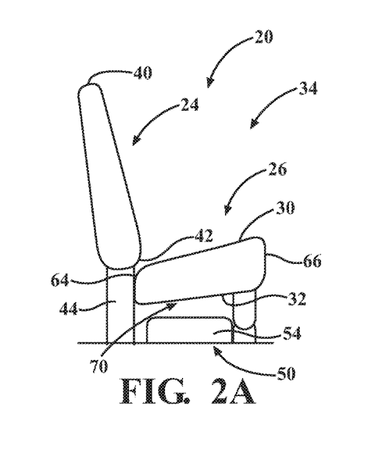
FIG. 2A is a side view of a first embodiment of the seat assembly with a seat bottom in a first position and a table in a stowed position.

Referring to FIG. 2A, in one or more arrangements, seat bottom 26 may include opposite inner and outer ends 64, 66. Inner end 64 of seat bottom 26 may be adjacent lower end 44 of seat back 24 when seat bottom 26 is in first position 34. Seat bottom 26 may be operable to support a seated occupant when in first position 34. When seat bottom 26 is in first position 34, table 48 may be in stowed position 50.

Figure 6:
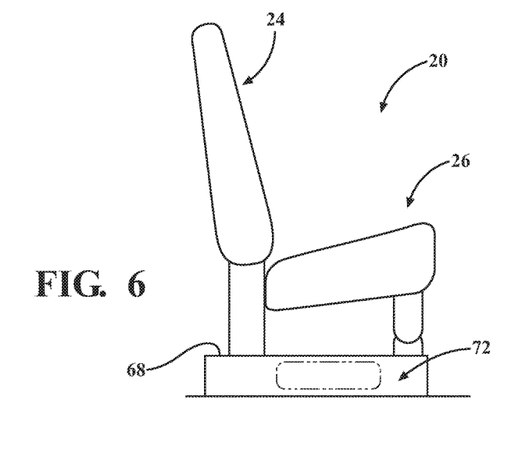
FIG. 6 is a side view of an alternate arrangement of the first embodiment of the seat assembly wherein the table is stowed in a space in a floor of the vehicle.

In one or more arrangements, table 48 may be configured to occupy a space 70 below seat bottom 26 when in stowed position 50. Space 70 may be between a floor 68 of vehicle 22 and bottom surface 32 of seat bottom 26, such as shown in FIG. 2A. Alternatively, table 48 may be configured to occupy a space 72 in floor 68 of vehicle 22, such as shown in FIG. 6. It should be appreciated that other arrangements are possible. For example, table 48 may be disposed or stored inside a drawer or slot below seat bottom 26 or occupy a space in seat bottom 26. In stowed position 50, legs 60, 62 attached to body member 54 may be selectably secured within body member 54 so as to conceal them from view or encumbrance of a seated occupant.

Figure 2B:
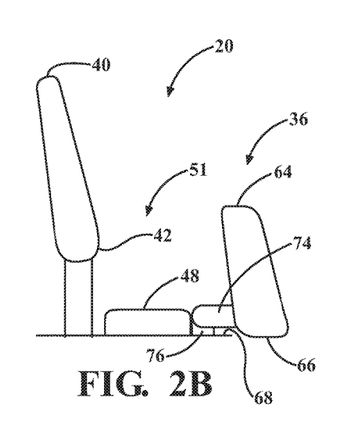
FIG. 2B is a side view of the first embodiment of the seat assembly with the seat bottom in a second position and the table in the stowed position.
Figure 2C:
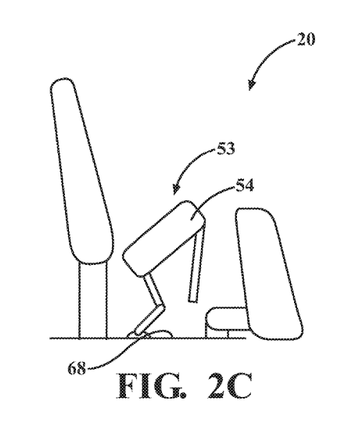
FIG. 2C is a side view of the first embodiment of the seat assembly with the table in an intermediate position.

In one or more arrangements, seat bottom 26 may be configured to move from first position 34 to second position 36, as shown in FIG. 2B. Seat bottom 26 may move in a direction toward a front of vehicle 22 such that inner end 64 of seat bottom 26 moves away from lower end 44 of seat back 24 and outer end 66 of seat bottom 26 moves adjacent floor 68 of vehicle 22. In moving from first position 34 to second position 36, a front seat post 74 may collapse forward about a front hinge 76. Seat bottom 26 may maintain second position 36 (in which seat bottom 26 is moved toward floor 68 of vehicle 22) given the mass of seat bottom 26 inhibiting seat bottom 26 from returning to first position 34. Additionally, a detent or lock feature may be employed, such as on front hinge 76, to inhibit seat bottom 26 from returning to first position 34.

Figure 2D:
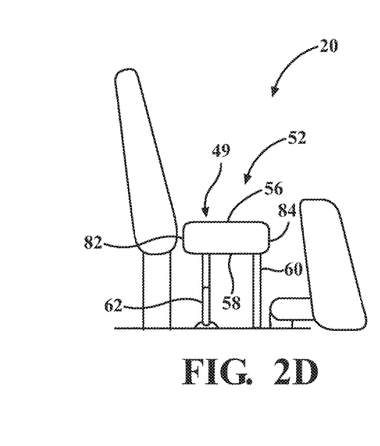
FIG. 2D is a side view of the first embodiment of the seat assembly with the table in an operative position.

In one or more arrangements, as shown in FIG. 2D, body member 54 may include opposite inner and outer edges 82, 84 with inner edge 82 being closer to seat back 24 when table 48 is in operative position 52. Body member 54 may be removable to allow for cleaning, replacement or the like.

Figure 4A:
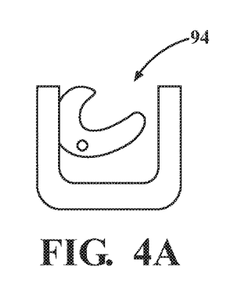
FIG. 4A is a side view of a latch mechanism for coupling a leg to the floor of the vehicle.
Figure 4B:
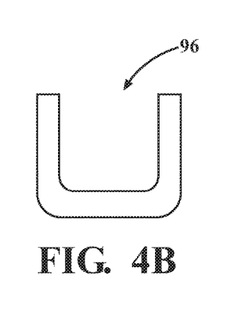
FIG. 4B is a side view of a channel for coupling a leg to the floor of the vehicle.

In one or more arrangements, first leg 60 may include a first end 86 operatively pivotally coupled to lower surface 58 of body member 54 adjacent to inner edge 82 or outer edge 84. Pivotal coupling may allow first leg 60 to fold. When in operative position 52, such as that shown in FIG. 8C, first leg 60 may extend generally downwardly from body member 54 such that a base 88 of first leg 60 is proximate floor 68 of vehicle 22. In one or more arrangements, first leg 60 is a generally U-shaped leg 60, such as that shown in FIGS. 8A and B. First leg 60 may be operative to support a user engaging upper/working surface 56 of body member 54 when first leg 60 is in a fully extended position 92. Base 88 of first leg 60 may include a padded foot or other such appliance as to facilitate contact of first leg 60 with floor 68 of vehicle 22 when in fully extended position 92. In fully extended position 92, first leg 60 may make a reversible lock-fit engagement with floor 68 of vehicle 22 using a device such as a latch 94 or a channel 96, as shown in FIGS. 4A and 4B.

In one or more arrangements, table 48 may be operatively coupled to floor 68 of vehicle 22, such as in FIGS. 2A-2D and 3A. Alternatively, table 48 may be operatively coupled to seat rail 98, such as in FIGS. 2E and 3B. When table 48 is secured to seat rail 98, table 48 may move in all directions, including but not limited to forward, aft, and transverse, that seat assembly 20 moves.

Figure 2E:
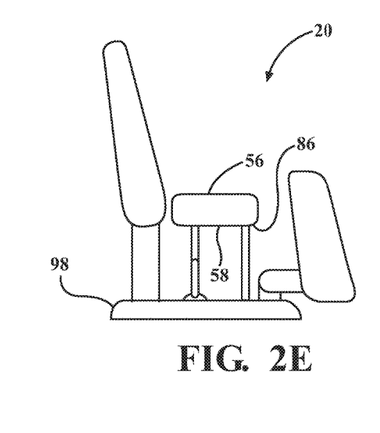
FIG. 2E is a side view of the first embodiment of the seat assembly with the table operatively coupled to a seat rail of the seat assembly.
Figure 3A:
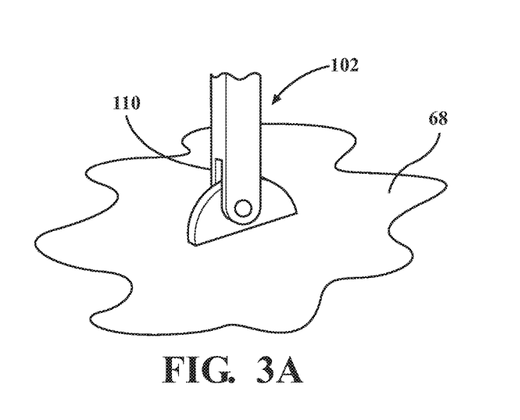
FIG. 3A is a fragmented perspective view of a leg operatively pivotally coupled to a floor of the vehicle.
Figure 3B:
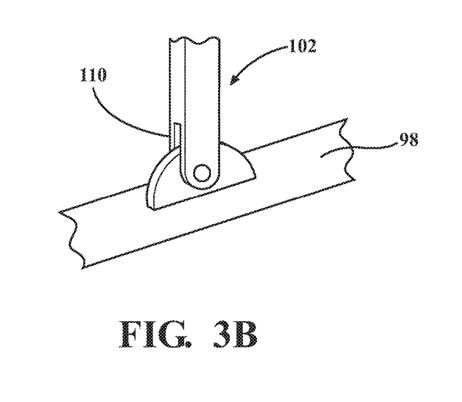
FIG. 3B is a fragmented perspective view of the a leg operatively pivotally coupled to a seat rail of the seat assembly.
Figure 8A:
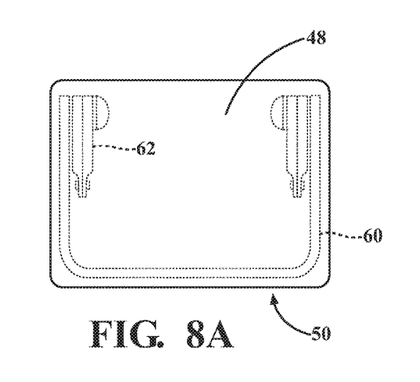
FIG. 8A is a plan view of the table of FIG. 2 in the stowed position.
Figure 8B:
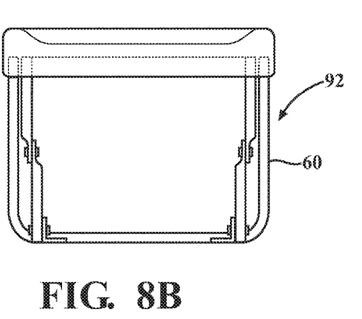
FIG. 8B is a front view of the table of FIG. 2 in the operative position.
Figure 8C:
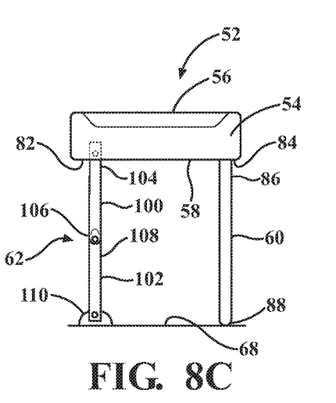
FIG. 8C is a side view of the table of FIG. 2 in the operative position.
Figure 9A:
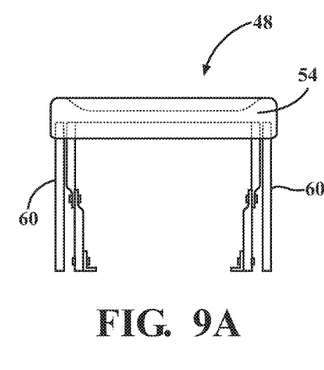
FIG. 9A is a front view of an alternate configuration of the table in the operative position wherein there is a pair of two straight legs.
Figure 9B:
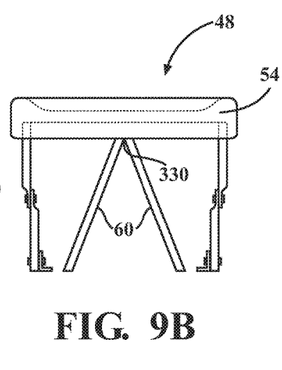
FIG. 9B is a front view of an alternate configuration of the table in the operative position wherein there is a pair of straight legs angled into a generally A-shaped configuration.
Figure 9C:
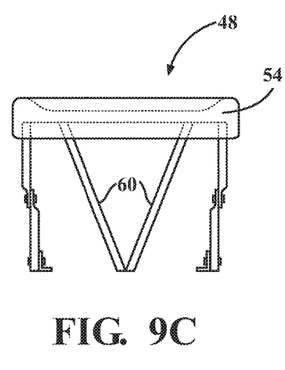
FIG. 9C is a front view of an alternate configuration of the table in the operative position wherein there is a pair of straight legs angled into a generally V-shaped configuration.
Figure 9D:
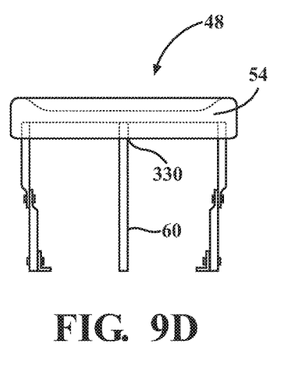
FIG. 9D is a front view of an alternate configuration of the table in the operative position wherein there is a single straight leg.

In one or more arrangements, as shown in FIG. 8C, second leg 62 may be coupled to lower surface 58 of body member 54 at either one of inner and outer edges 82, 84, such that second leg 62 is coupled to lower surface 58 of body member 54 opposite first leg 60. Second leg 62 may have first and second portions 100,102. A first end 104 of first portion 100 may be pivotally coupled to lower surface 58 of body member 54 and a second end 106 of first portion 100 may be pivotally coupled to a first end 108 of second portion 102. Pivotal coupling allows second leg 62 to fold upon itself. A second end 110 of second portion 102 may be operatively pivotally coupled to floor 68 of vehicle 22, as is shown in FIG. 3A. Alternatively, as shown in FIGS. 2E and 3B, second end 110 of second portion 102 may be operatively pivotally coupled to seat rail 98. The lengths of first portion 100 and second portion 102 may be equivalent or, alternatively, one portion may be longer than the other portion.

Figures 5A, 5B:
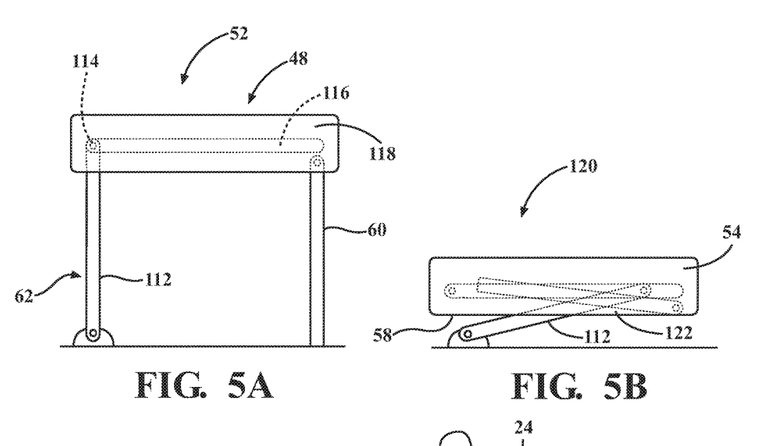
FIG. 5A is a side view of an alternate configuration of the table in the operative position wherein a leg is pivotally coupled to a track in the table.
FIG. 5B is a side view of the table of FIG. 5A in an intermediate position.
Figure 5C:
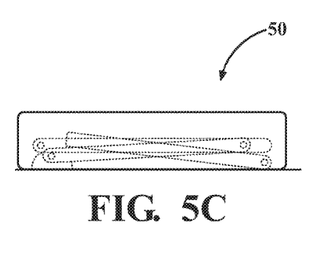
FIG. 5C is a side view of the table of FIG. 5A in a stowed position.

In one or more arrangements, second leg 62 may comprise a single leg portion 112, such as shown in FIG. 5A. Single leg portion 112 may have a first end 114 pivotally coupled to a track 116 on a side portion 118 of body member 54. Track 116 may run along an outer side or an inner side of body member 54. First end 114 of single leg portion 112 may be moveable along track 116 as body member 54 moves between stowed position 50, as shown in FIG. 5C, an intermediate position 120, such as that shown in FIG. 5B, and operative position 52, as shown in FIG. 5A. In intermediate and stowed positions 120, 50, second leg 62 may occupy a space 122 proximate lower surface 58 of body member 54.

In one or more arrangements, as shown in FIG. 8A, both first leg 60 and second leg 62 may tuck into space 122 proximate lower surface 58 of body member 54. Both first leg 60 and second leg 62 may be selectably held in place by a securing mechanism such as latch 94 or channel 96 shown in FIGS. 3A and 3B, securing legs in a space 122 proximate lower surface 58 of body member 54 when table 48 is in stowed position 50.

Figure 7A:
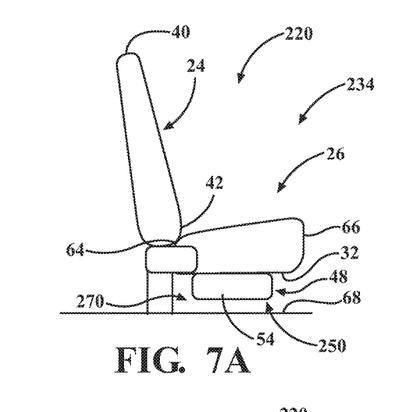
FIG. 7A is a side view of a second embodiment of a seat assembly with the seat bottom in the first position and a table in a stowed position.

In a second embodiment of the invention, seat assembly 220 may move in a different manner. In one or more arrangements, as shown in FIG. 7A, seat assembly 220 may include seat bottom 26 having opposite inner and outer ends 64, 66 with inner end 64 adjacent lower end 42 of seat back 24 when seat bottom 26 is in a first position 234. Seat bottom 26 may be operable to support a seated occupant when in first position 234. When seat bottom 26 is in first position 234, table 48 may be in a stowed position 250. Table 48 may be configured in stowed position 250 to have a plurality of legs reversibly secured within the body member 54 so as to conceal the legs from view or encumbrance of a seated occupant. In stowed position 250, table 48 may occupy a space 270 below seat bottom 26 between floor 68 and bottom surface 32 of seat bottom 26, as shown in FIG. 7A. Alternatively, table 48 may occupy a space 272 inside seat bottom 26, as shown in FIG. 7E. Other arrangements are possible. For example, table 48 may be disposed or stored inside a drawer or slot below seat bottom 226. In one or more arrangements, table 48 may move in all directions, including but not limited to forward, aft, and transverse, that seat assembly 220 moves.

Figure 7B:
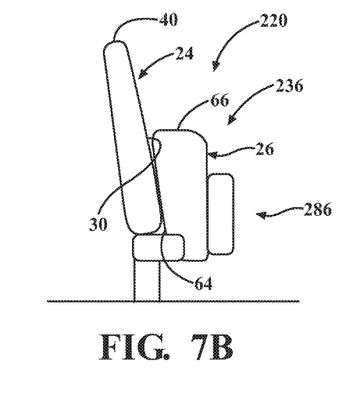
FIG. 7B is a side view of the second embodiment of the seat assembly with the seat bottom in a second position.

In one or more arrangements, seat bottom 26 may be configured to move to a second position 236, such as that shown in FIG. 7B. Seat bottom 26 may move in a direction toward a rear of vehicle 22 such that outer end 66 of seat bottom 26 moves toward upper end 40 of seat back 24 and inner end 64 of seat bottom 26 moves adjacent seating surface 30 of seat back 24. Seat bottom 26 may maintain second position 236 (in which seat bottom 26 is moved adjacent to seating surface 30 of seat back 24) by employing a releasable locking mechanism such as but not limited to a lock, lever, clip or latch, that inhibits seat bottom 26 from returning to first position 234.

Figure 7C:
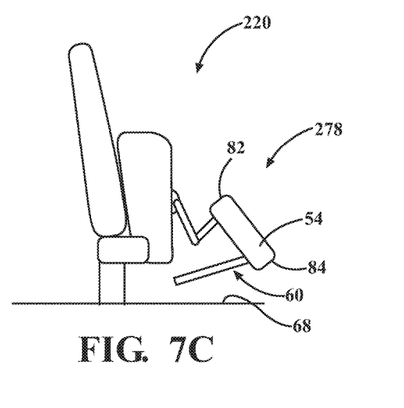
FIG. 7C is a side view of the second embodiment of the seat assembly with the table in an intermediate position.
Figure 7D:
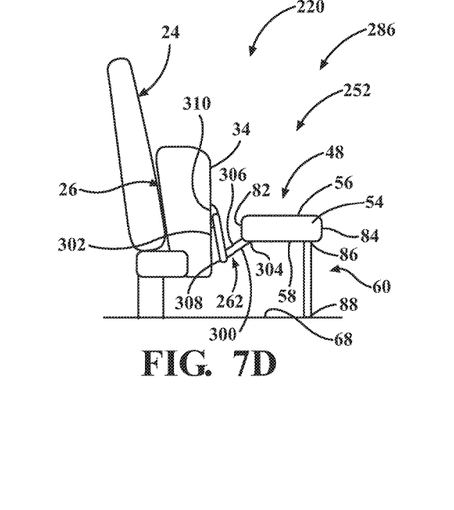
FIG. 7D is a side view of the second embodiment of the seat assembly with the table in the operative position.
Figure 7E:
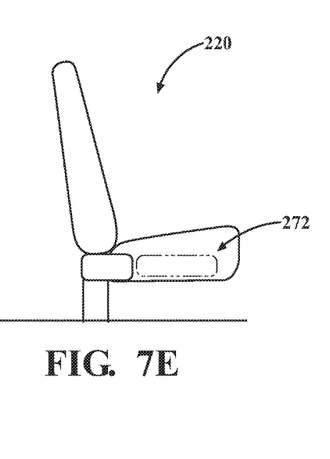
FIG. 7E is a side view of an alternative arrangement of the second embodiment of the seat assembly wherein the table is disposed in the seat bottom while in the stowed position.
Figure 7F:
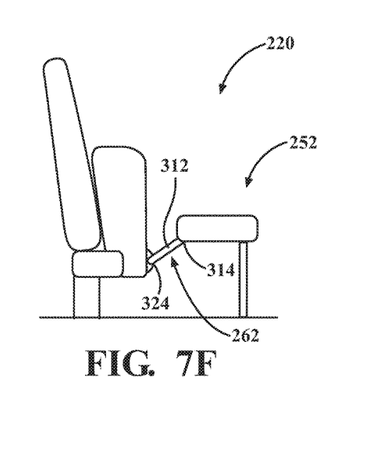
FIG. 7F is a side view of an alternative configuration of the second embodiment of the seat assembly wherein the table has a leg portion coupled to the seat bottom.

In one or more arrangements, table 48 may be moveable from stowed position 250, as shown in FIG. 7A, through an intermediate position 278, such as that shown in FIG. 7C, to operative position 252, as shown in FIGS. 7D-7F. In intermediate position 278 first leg 60 is not yet fully deployed and in not in contact with floor 68 of vehicle 22. When moving from stowed position 250 to operative position 252, table 48 may occupy a space 286 in front of seat bottom 26 and seat back 24. When seat bottom 26 is moving from second position 236 to first position 234, a release button, lever release, latch release or the like may be employed to allow seat bottom 26 to return to first position 234. In one or more arrangements, as shown in FIG. 7D, inner edge 82 of body member 54 may be adjacent or proximate bottom surface 34 of seat bottom 26 when table 48 is in operative position 252.

In one or more arrangements, first leg 60 may have first end 86 pivotally coupled to lower surface 58 of body member 54 adjacent one of inner edge 82 or outer edge 84. Pivotal coupling allows first leg 60 to fold beneath body member 54. When in operative position 252, first leg 60 may extend generally downwardly from body member 54 such that base 88 of first leg 60 is proximate floor 68 of vehicle 22. Base 88 of first leg 60 may include a padded foot or other such appliance so as to facilitate contact of first leg 60 with floor 68 when in fully extended position 92. First leg 60 may be a generally U-shaped leg 60, as shown in FIG. 8B. First leg 60 may be operative to support an occupant engaging upper/working surface 56 of body member 54 when first leg 60 is in fully extended position 92. In fully extended position 92, first leg 60 may make reversible lock-fit engagement with floor 68 of vehicle 22 using a device such as latch 94 or channel 96, as shown in FIGS. 4A-4B.

In one or more arrangements, second leg 262 may be pivotally coupled to lower surface 58 of body member 54 at either one of inner edge 82 and outer edges 84. Further, second leg 262 may be pivotally coupled to lower surface 58 of body member 54 opposite first leg 60. Pivotal coupling allows second leg 262 to fold. Second leg 262 may have first and second portions 300,302. A first end 304 of first portion 300 may be coupled to lower surface 58 of body member 54 and a second end 306 of first portion 300 may be pivotally coupled to a first end 308 of second portion 302. A second end 310 of second portion 302 may be operatively pivotally coupled to bottom surface 34 of seat bottom 26, as is shown in FIG. 7D. The lengths of first and second portions 300, 302 of second leg 262 may be equivalent or, alternatively, one portion may be longer than the other portion. Alternatively, as shown in both FIG. 7F, second leg 262 may comprise single leg portion 312 having a first end 314 operatively pivotally coupled to lower surface 58 of body member 54 and a second end 324 operatively pivotally coupled to bottom surface 34 of seat bottom 26.

In one or more arrangements, first leg 60 of table 48 may have differing configurations, as shown in FIGS. 9A-9D. First leg 60 may be two straight legs 60 with an attachment to lower surface 58 of body member 54 adjacent inner edge 82 or outer edge 84 with straight legs 60 extending generally vertically downward when body member 54 is in operative position 52, such as that shown in FIG. 8A. First leg 60 may be two angled legs 60 that extend generally downward in a generally A-shaped configuration, such as that shown in FIG. 8B. In this configuration, legs 60 may be attached to lower surface 58 of body member 54 proximate a midpoint 330 between inner edge and outer edges 82, 84 of body member 54. First leg 60 may be two angled legs 60 that extend generally downward in a generally V-shaped configuration, such as that shown in FIG. 8C. In this configuration, legs 60 may be attached to lower surface 58 of body member 54 relatively proximate inner edge 82 and outer edge 84. Additionally, first leg 60 may be one straight leg 60 that extends generally downward, such as that shown in FIG. 8D. In this configuration, legs 60 may be attached to lower surface 58 of body member 54 proximate midpoint 330 between the inner edge 82 and outer edge 84.

Aspects herein can be embodied in other forms without departing from the spirit or essential attributes thereof. Accordingly, reference should be made to the following claims, rather than to the foregoing specification, as indicating the scope of the invention.

What is claimed is:

1. A seat assembly for a vehicle, the seat assembly comprising:
   a seat back having opposite upper and lower ends;
   a seat bottom having opposite inner and outer ends and opposite upper and lower surfaces, the seat bottom being moveable relative to the seat back between a generally horizontal first position and a second position, the inner end of the seat bottom being adjacent the lower end of the seat back when the seat bottom is in the first position, the seat bottom being operable to support an occupant on the upper surface when in the first position; and
   a table operatively coupled to the vehicle and having a body member and at least one first leg, the body member movable between a stowed position and an operative position when the seat bottom is in the second position, the body member when in the stowed position being disposed adjacent the lower surface of the seat bottom when in the first position, and the body member being generally horizontally orientated when in the operative position, the body member having opposite inner and outer edges, the inner edge being closer to the seat back than the outer edge when in the operative position, the at least one first leg pivotally coupled to the body member adjacent one of the inner and outer edges.

2. The seat assembly of claim 1, wherein the at least one first leg extends generally downwardly from and supports the body member when in the operative position and is tucked below the body member when in the stowed position.

3. The seat assembly of claim 2, wherein the table further comprises at least one second leg having first and second ends, the first end operatively pivotally coupled to the body member adjacent the other one of the inner and outer edges, the second end operatively pivotally coupled to one of a floor of the vehicle, a rail of the seat assembly, and the seat bottom, the at least one second leg supporting the body member when in the operative position and being tucked below the body member when in the stowed position.

4. The seat assembly of claim 3, wherein the seat bottom moves away from the seat back forming a space between the seat bottom and the seat back when in the second position with the inner end of the seat bottom higher than the outer end of the seat bottom and the body member being disposed in the space when in the operative position.

5. The seat assembly of claim 3, wherein the seat bottom moves toward the seat back forming a space in front of the seat back and seat bottom when in the second position with the outer end higher than the inner end and the body member being disposed in the space when in the operative position.

6. The seat assembly of claim 3, wherein the at least one second leg is a two-bar assembly with one end of a first bar pivotally coupled to one of the floor of the vehicle, the rail of the seat assembly, and the seat bottom, the other end of the first bar pivotally coupled to one end of a second bar and the other end of the second bar pivotally coupled to the body member.

7. The seat assembly of claim 3, wherein the second end of the at least one second leg is operatively pivotally coupled to the seat bottom.

8. The seat assembly of claim 2, wherein the table further comprises at least one second leg having first and second ends, the first end pivotally coupled to a track on the body member and moveable along the track as the body member moves between the stowed and operative positions, the second end operatively pivotally coupled to one of a floor of the vehicle and a rail of the seat assembly, the at least one second leg supporting the body member when in the operative position and being generally horizontally oriented when in the stowed position.

9. The seat assembly of claim 2, wherein a first end of the at least one first leg is pivotally coupled to the body member adjacent one of the inner and outer edges and a second end of the at least one first leg is a free end.

10. A seat assembly for a vehicle, the seat assembly comprising:
a seat back having opposite upper and lower ends;
a seat bottom having opposite inner and outer ends and opposite upper and lower surfaces, the seat bottom being moveable relative to the seat back between a generally horizontal first position and a second position, the inner end of the seat bottom being adjacent the lower end of the seat back when the seat bottom is in the first position, the seat bottom being operable to support an occupant on the upper surface when in the first position;
a table operatively coupled to the vehicle and having a body member and at least one first leg, the body member movable between a stowed position and an operative position when the seat bottom is in the second position, the body member when in the stowed position being disposed adjacent the lower surface of the seat bottom when in the first position, the body member being generally horizontally orientated when in the operative position, the body member having opposite inner and outer edges, the inner edge being closer to the seat back than the outer edge when in the operative position, the at least one first leg pivotally coupled to the body member adjacent one of the inner and outer edges, the at least one first leg extending generally downwardly from and supporting the body member when in the operative position and being tucked below the body member when in the stowed position.

11. The seat assembly of claim 10, wherein the table further comprises at least one second leg having first and second ends, the first end operatively pivotally coupled to the body member adjacent the other one of the inner and outer edges, the second end operatively pivotally coupled to one of a floor of the vehicle, a rail of the seat assembly, and the seat bottom, the at least one second leg supporting the body member when in the operative position and being tucked below the body member when in the stowed position.

12. The seat assembly of claim 11, wherein the seat bottom moves away from the seat back forming a space between the seat bottom and the seat back when in the second position with the inner end of the seat bottom higher than the outer end of the seat bottom and the body member being disposed in the space when in the operative position.

13. The seat assembly of claim 11, wherein the seat bottom moves toward the seat back forming a space in front of the seat back and seat bottom when in the second position with the outer end higher than the inner end and the body member being disposed in the space when in the operative position.

14. The seat assembly of claim 11, wherein the at least one second leg is a two-bar assembly with one end of a first bar pivotally coupled to one of the floor of the vehicle, the rail of the seat assembly, and the seat bottom, the other end of the first bar pivotally coupled to one end of a second bar and the other end of the second bar pivotally coupled to the body member.

15. The seat assembly of claim 11, wherein the second end of the at least one second leg is operatively pivotally coupled to the seat bottom.

16. The seat assembly of claim 10, wherein the table further comprises at least one second leg having first and second ends, the first end pivotally coupled to a track on the body member and moveable along the track as the body member moves between the stowed and operative positions, the second end operatively pivotally coupled to one of a floor of the vehicle and a rail of the seat assembly, the at least one second leg supporting the body member when in the operative position and being generally horizontally oriented when in the stowed position.

17. The seat assembly of claim 10, wherein a first end of the at least one first leg is pivotally coupled to the body member adjacent one of the inner and outer edges and a second end of the at least one first leg is a free end.

18. A seat assembly for a vehicle, the seat assembly comprising:
a seat back having opposite upper and lower ends;
a seat bottom having opposite inner and outer ends and opposite upper and lower surfaces, the seat bottom being moveable relative to the seat back between a generally horizontal first position and a second position forming one of a space either between the seat bottom and the seat back or front of the seat back and seat bottom, the inner end of the seat bottom being adjacent the lower end of the seat back when the seat bottom is in the first position, the seat bottom being operable to support an occupant on the upper surface when in the first position; and
a table operatively coupled to the vehicle and having a body member and at least one first leg, the body member movable between a stowed position and an operative position when the seat bottom is in the second position, the body member when in the stowed position being disposed adjacent the lower surface of the seat bottom when in the first position, and the body member being generally horizontally orientated when in the operative position, the body member having opposite inner and outer edges, the inner edge being closer to the seat back than the outer edge when in the operative position, the at least one first leg pivotally coupled to the body member adjacent one of the inner and outer edges.

19. The seat assembly of claim 18, wherein the seat bottom moves away from the seat back forming the space between the seat bottom and the seat back when in the second position with the inner end of the seat bottom higher than the outer end of the seat bottom and the body member being disposed in the space when in the operative position.

20. The seat assembly of claim 18, wherein the seat bottom moves toward the seat back forming the space in front of the seat back and seat bottom when in the second position with the outer end higher than the inner end and the body member being disposed in the space when in the operative position.

* * * * *